United States Patent [19]

Cawley

[11] Patent Number: 5,361,334
[45] Date of Patent: Nov. 1, 1994

[54] DATA PROCESSING AND COMMUNICATION

[75] Inventor: Robin A. Cawley, Burghclere, England

[73] Assignee: Quantel Limited, Newbury, Great Britain

[21] Appl. No.: 31,930

[22] Filed: Mar. 15, 1993

Related U.S. Application Data

[63] Continuation of Ser. No. 297,698, Jan. 17, 1989, abandoned.

[30] Foreign Application Priority Data

Jan. 15, 1988 [GB] United Kingdom ............... 88 00943
Aug. 12, 1988 [GB] United Kingdom ............... 88 19207

[51] Int. Cl.$^5$ .......................................... G06F 15/20
[52] U.S. Cl. .................................. 395/200; 395/650; 364/263.3; 364/DIG. 1
[58] Field of Search ................... 395/200, 325, 650

[56] References Cited

U.S. PATENT DOCUMENTS

| 3,676,852 | 7/1972 | Abernathy et al. | 364/200 |
| 4,400,768 | 8/1983 | Tomlinson | 364/200 |
| 4,494,188 | 1/1985 | Nakane et al. | 364/200 |
| 5,021,947 | 6/1991 | Campbell et al. | 382/49 X |
| 5,101,488 | 3/1992 | Rosenthal et al. | 395/425 |
| 5,133,053 | 7/1992 | Johnson et al. | 395/200 |
| 5,212,773 | 5/1993 | Hillis | 395/200 |
| 5,212,778 | 5/1993 | Dally et al. | 395/400 |
| 5,218,676 | 6/1993 | Ben-Ayed et al. | 395/200 |
| 5,247,613 | 9/1993 | Bromley | 395/200 |
| 5,274,782 | 12/1993 | Chalasani et al. | 395/325 |

FOREIGN PATENT DOCUMENTS

| 0178473 | 9/1985 | European Pat. Off. . |
| 0206512 | 5/1986 | European Pat. Off. . |
| 0225022 | 10/1986 | European Pat. Off. . |
| 0325384 | 7/1989 | European Pat. Off. . |

OTHER PUBLICATIONS

Naeini, R. et al., "A Multicomputing Environment," Wescon Proceedings, vol. 29, San Francisco, Nov. 19-22, 1985, pp. 1-13.
Faro, A. et al., "A Multimicrocomputer-based Structure for Computer Networking," IEEE Micro, vol. 5, No. 2, Apr. 1985, pp. 53-66.
Van Tilborg, A. M. et al., "Packet Switching in the Micronet Network Computer," IEEE Transactions on Communications, vol. COM-30, No. 6, Jun., 1982, pp. 1426-1433.
"This CPU Does Floating Point Faster Than Any Two-Chip Set," Electronics, Nov. 27, 1986, pp. 51-55.
Jones, T. et al., "Supercomputer Breaks Price Barrier For Vector Processing," Computer Design, vol. 24, Apr. 1985, pp. 169-176.
Pian, C. K. et al., "Signal Processing Through Macro Data Flow Architecture," Proceedings of the IEEE 1985 National Aerospace and Electronics Conference, Naecon 1985, Dayton Conv. Ctr., pp. 8-16.
Klappholz, D. et al., "Toward A Hybrid Data-Flow-/Control-Flow Mind Architecture," Proceedings of the 5th Int'l Conf. on Distributed Computing Systems, May 13-17, 1985, Denver, Colo., pp. 10-15, IEEE, US.

*Primary Examiner*—Edward R. Cosimano
*Attorney, Agent, or Firm*—Cooper & Dunham

[57] ABSTRACT

A data processing system having a plurality of processing units (C1, C2), a plurality of memory units (M1, M2) and a communication system providing communication between the processing units and the memory units. The processing units each have a plurality of register sets (R1, R2) allowing them to run a plurality of processes. When a process requires data from memory, which it receives over the communication system, its respective processing unit processes another of its processes until that requires data. Data is transmitted over the communication system, which may be configured as a grid, in the form of packets. The grid is configured from routing devices which include first-in-first-out devices for the buffering of packets. The system facilitates the construction of circuits integrated onto a singel wafter of semiconducting material. Furthermore the grid structure may also be employed as a local area network and computers having a similar architecture may be connected to the network providing a processing facility of considerable power.

31 Claims, 7 Drawing Sheets

DATA PROCESSING AND COMMUNICATION

This is a continuation of application Ser. No. 07/297,698 filed Jan. 17, 1989, now abandoned.

The present invention relates to a data processing system having two or more processing units. The invention also relates to a communication system with a plurality of routing means which is suitable for providing communication between processing units of said data processing system but which may also be applied to other communication environments such as local area networks and circuits integrated onto a single wafer of semi conducting material.

BACKGROUND OF THE INVENTION

A conventional VLSI central processing unit (CPU) consists of four functional parts, namely the instruction unit, the arithmetic logic unit, a file of registers, and the bus (or buses) connecting the CPU to its external memory devices. Normal operation consists of fetching instructions from the memory device and supplying them to the instruction unit via a bus. The arithmetic logic unit will then read data from, and write new data back to, the registers and memory devices via a bus in response to control signals form the instruction unit. The register file usually contains a number of general purpose registers (address and data) and special purpose registers such as stack pointers and status registers etc. However one register which is common to all conventional central processing units is the program counter which is responsible for identifying the address of the next instruction.

Over recent years the processing speed of central processing units has increased dramatically and it is now accepted that, when implemented using similar techniques, the overall speed of operation of a data processing system is determined not by the speed at which the CPU can execute instructions but by the speed at which data may be transferred between the CPU and its associated memory devices. This problem is then exacerbated in machines designed to run large programs in which large (but slow) memory devices are selected in preference to fast (but smaller) devices which would improve system performance.

Techniques are known for improving the operating speed of a system but, in addition to increasing the price, these also result in creating new constraints. Furthermore these techniques do not resolve speed problems related to the bus, which also affects performance particularly when many separate memory devices make up the total addressable space.

It is therefore an object of a first aspect of the present invention to provide an improved data processing apparatus of the type in which processing is distributed between two or more processing units.

In a data processing system of the type having distributed processors a communication system must be provided between processors and remote memory delves. In a conventional processing system the addition of further processing units will provide a diminishing return in overall processing power as the buses become fully loaded; it becoming necessary to increase the available bandwidth. Problems of this type occur in many environments where a number of devices must communicate with each other and it is not possible to provide individual communication links between each device and every other device. Known solutions may be classified into four types, namely: bus, ring, crosspoint and store-and-forward, with of course, many hybrid systems. It is therefore an object of a second aspect of the present invention to provide an improved communication system.

SUMMARY OF THE INVENTION

According to a first aspect of the present invention there is provided data processing apparatus comprising having two or more processing units, characterised by two or more memory units, and a communication system providing communication between said processing units and said memory unit; wherein each of said processing units includes:

- a plurality of register sets each capable of receiving data relating to a respective process;
- and processing means for, processing a first process by accessing a first of said register sets until said first process requires a first datum to be supplied via said communication system,
- requesting via said communication system a first datum to be supplied back via said communication system and discontinuing the processing of said first process pending the receipt of said first datum, and processing a second process by accessing a second register set.

An advantage of a data processing apparatus according to the first aspect of the invention is that it allows a high power computer to be constructed in which the ratio of performance to price does not significantly diminish as more units are added. This is because a data transfer does not hold up a processing unit which reverts to processing a second process while waiting for a datum for the first.

In a preferred embodiment several processes running on the same processing unit may each be waiting for a datum to be returned from the communication system. Preferably all data requests are made through the communication system and none of the processing units are provided with dedicated addressable memory devices. Furthermore, not only must all data be accessed via the communication system but in a preferred embodiment a datum may be selectively read form any of the memory units.

According to a second aspect of the invention there is provided a communication system comprising a plurality of routing means connected by transmission means characterised by:

- each of said routing means having at least two input ports and at least two output ports;
- said input port being arranged to receive data packets via a respective first-in-first-out (FIFO) memory device;
- said data packets having a plurality of temporally separated words including a local destination word, and each of said words including a plurality of spacially separated digits;
- said routing means including means for selectively directing packets to one of its said at least two output ports in response to the local destination word of the packet, and means for controlling the transmission properties of its respective FIFO to prevent data collision within the said routing means.

The problem of overloaded buses, and the subsequent problems associated with providing additional bandwidth, are overcome in the communication system according to the second aspect of the invention by providing a hybrid system having features of the known ring, crosspoint and store-and-forward techniques. Thus data is buffered at each routing means as in a ring but the actual path varies as in the cross point system. Furthermore, to prevent grid lock data may be stored in the FIFOs as in the store and forward system.

In a preferred embodiment each routing means and its associated FIFOs, preferably connected to the input ports, is fabricated on a single chip allowing networks to be configured from standard units. Preferably sufficient ports are provided so that each routing means may be connected to four other routing means. The network may then be configured as a two dimensional grid or as a multi-dimensional hypercube.

Preferably the data processing system of the first aspect of the invention has a communication system according to the second aspect of the invention. Requests for a datum are then made by supplying packets to the communication system which are routed to a memory unit by the routing means and then interpreted by said memory unit.

In an alternative preferred embodiment, of said second aspect, the routing means are nodes of a local area network. A plurality of networks may also be connected by similar routing means, the combined communication then being referred to as a second level area network.

In another preferred embodiment a communication system according to said second aspect may be fabricated on a single wafer of semiconductor material. Preferably a data processing system according to said first aspect, which may have a communicating system according to said second aspect, is integrated onto a single wafer of semiconducting material. The invention may be advantageously applied to this technique because of its fault tolerance capabilities. Thus, preferably, the routing means are programmed automatically after fabrication so that packets are not directed to any damaged areas of the circuit.

Embodiments of the invention will now be described by way of example only with reference to the accompanying drawings.

DETAILED DESCRIPTION OF THE INVENTION

Figure 1:
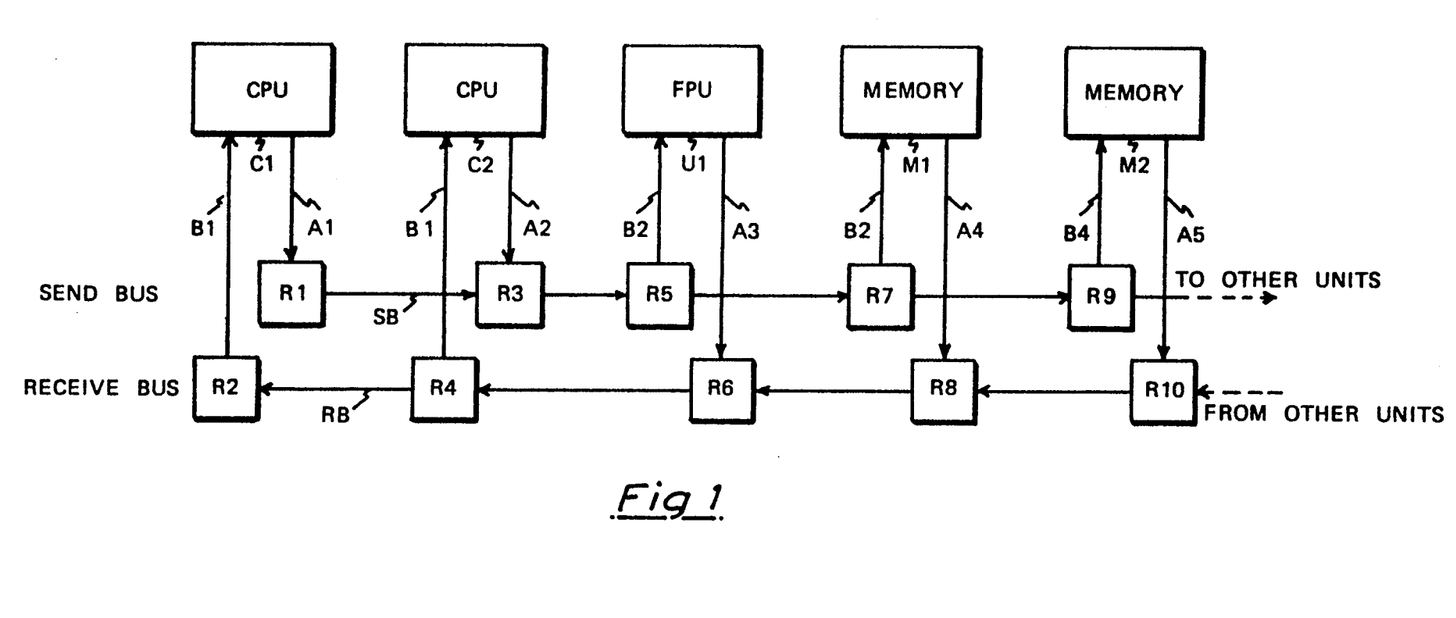
FIG. 1 shows a data processing system having a plurality of processing units, memory units and a communication system.
Figure 2:
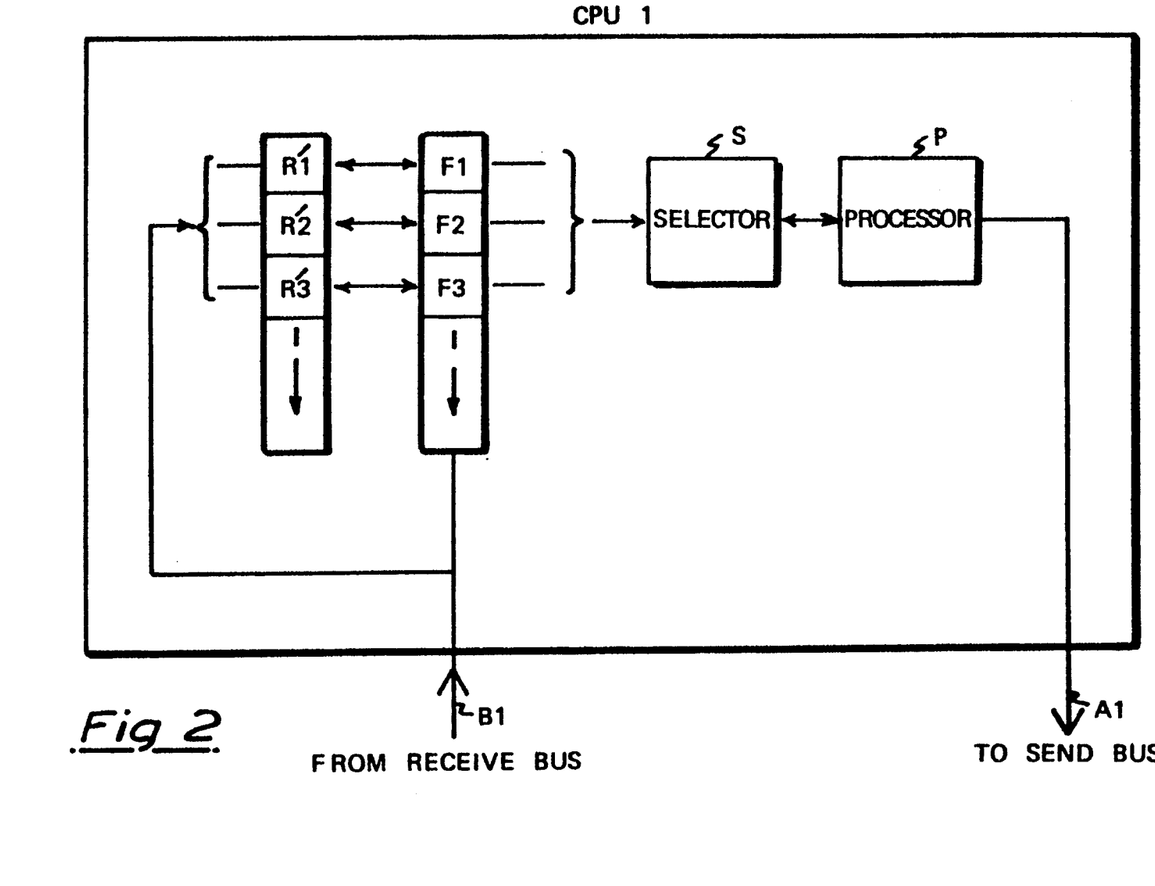
FIG. 2 details one of the processing units shown in FIG. 1.

A data processing system, more commonly referred to as a computer, is illustrated in FIG. 1 which comprises multiple processing units (CPU's), multiple memory banks and at least one specialised data processing unit. Two CPU's, C1 and C2, two memory banks M1 and M2 and a data processing unit in the form of an FPU (floating point unit) are represented. The number of units of each kind may be greater, and the various CPU's need not be the same, the same being true of the specialised units. As illustrated in FIG. 2 in the case of CPU C1, each CPU, has a group of register sets R'1, R'2 . . . (referred to as contexts) for processes to be processed. Flags F1, F2 . . . provide means for defining whether a process in a respective context R'1, R'2 . . . can be processed at a particular time. The CPU also has a selector S which is arranged to select one or more of the contexts, which as denoted by the flags F1, F2 . . . are currently able to be processed. A context which is selected is passed by the selector S to the processor P of the CPU where it is processed in accordance with the instructions included in the context. The processor P has an access path A1 by which the processor can make requests for access to memory or a unit such as U1. The processor P is arranged to attach identifying information to each such request, in general the identifying information being returned with the reply from the memory or other unit. As can be seen on FIG. 1, the access path A1 is connected to a send bus SB by a respective router R1. Replies are received in CPU C1 via a reply path B1 and are applied to the flags F1, F2 . . . and to the register sets R'1, R'2 . . . As can be seen in FIG. 1, the reply path B1 leads from a router R2, which receives messages from a receive bus RB.

Any other CPUs such as C2 included in the system will comprise elements such as shown in FIG. 2, but may differ in other respects. The units U1, M1 and M2 include devices, for example addressable memory, of known construction which may be purchased as integrated packages. In addition each unit also includes a controller for receiving and interpreting packets. A memory controller, for example, may transfer blocks of data in response to a single instruction and may also be programmed with details of the instruction set of a processing unit allowing a block of data to be read until a predetermined length is reached or on reaching an instruction to branch to another area of memory. In spin locking systems the memory controller may also include the memory locking means.

The computer may be configured with at least one vector type processor, having its registers arranged in sets, and a block of data are then supplied in response to a single request. As can be seen, the processors may be of many different types but typically have a processing power equivalent to that of a conventional micro processor, preferably operating with sixteen or thirty two bit words. The send bus SB and receive bus RB are common to all the units, which are connected to the buses by respective access paths, reply paths and routers. The access paths are denoted by references A, the reply paths by reference B, and the routers by reference R, with appropriate suffices in each case.

In operation of the system, the selector S of the CPU, or each CPU if there is more than one, will pick a runnable process from the register set R'1, R'2 . . . and processor P then executes instructions on behalf of the selected process until it requires access to (say) one of the memory banks M1, M2 . . . . The processor P then sends out the appropriate memory request, typically for a memory read or write, conditions the appropriate one of the flags F1, F2 . . . to signal that the process is no longer runnable, and causes the selector to select the next available process flagged as runnable. The memory request is routed via the odd-numbered routers R and send bus SB to the correct memory bank, the processor P executes instructions in response to the newly selected process (or possibly more than one such process in succession). Some time later the reply to the first request will be received from memory bank M1 via the even numbered routers R and the receive bus RB. The reply is applied to the respective register set R'1, R'2 . . . and the respective flag F1, F2 . . . , which flags that the first process is again runnable. At some later time, when the processor P has discontinued running some other process, selector S will again select the first process and the processor will continue running that process. Subsequently another request to a memory bank may be required and in that event the processor will again send out a memory request and discontinue running the first process yet again. In this way the running of a number of processes can be dovetailed together. The system is moreover such that it can be expanded by replicating the components without any particular component becoming a bottleneck. The ratio and absolute numbers of each component can be varied to suit different requirements. The send bus SB is capable of accepting requests faster than any single memory bank M is capable of honouring them, but it is also capable of handing requests to several memory banks M1, M2 . . . where they are honoured in parallel. A CPU may switch contexts at times other then the transmission of a message to a memory bank or specialised data processing unit, for example in order to give all contexts a fair share of the available processing power. In exceptional circumstances a CPU may send a message to which no reply is expected and therefore will not switch processes.

Where multiple CPUs are fitted as indicated in FIG. 1, the identifying information in a reply received from a memory bank M, or specialised data processing unit U, includes a CPU code as well as a process code, so that the reply can be routed to the correct CPU. Furthermore, all CPUs need not be the same, for example some may be special processors fitted for artificial intelligence languages, graphics or Fourier transforms etc.

Specialised data processing units, such as the FPU U1, may be replicated in the same way as memory banks. The requests sent to such units may comprise a set of operands, the results being returned later with the respective context identifier. There may be more specialised data processing units than memory banks, or vice versa as required, especially when very fast processing is required when units such as an FPU are pipelined.

Figure 7:
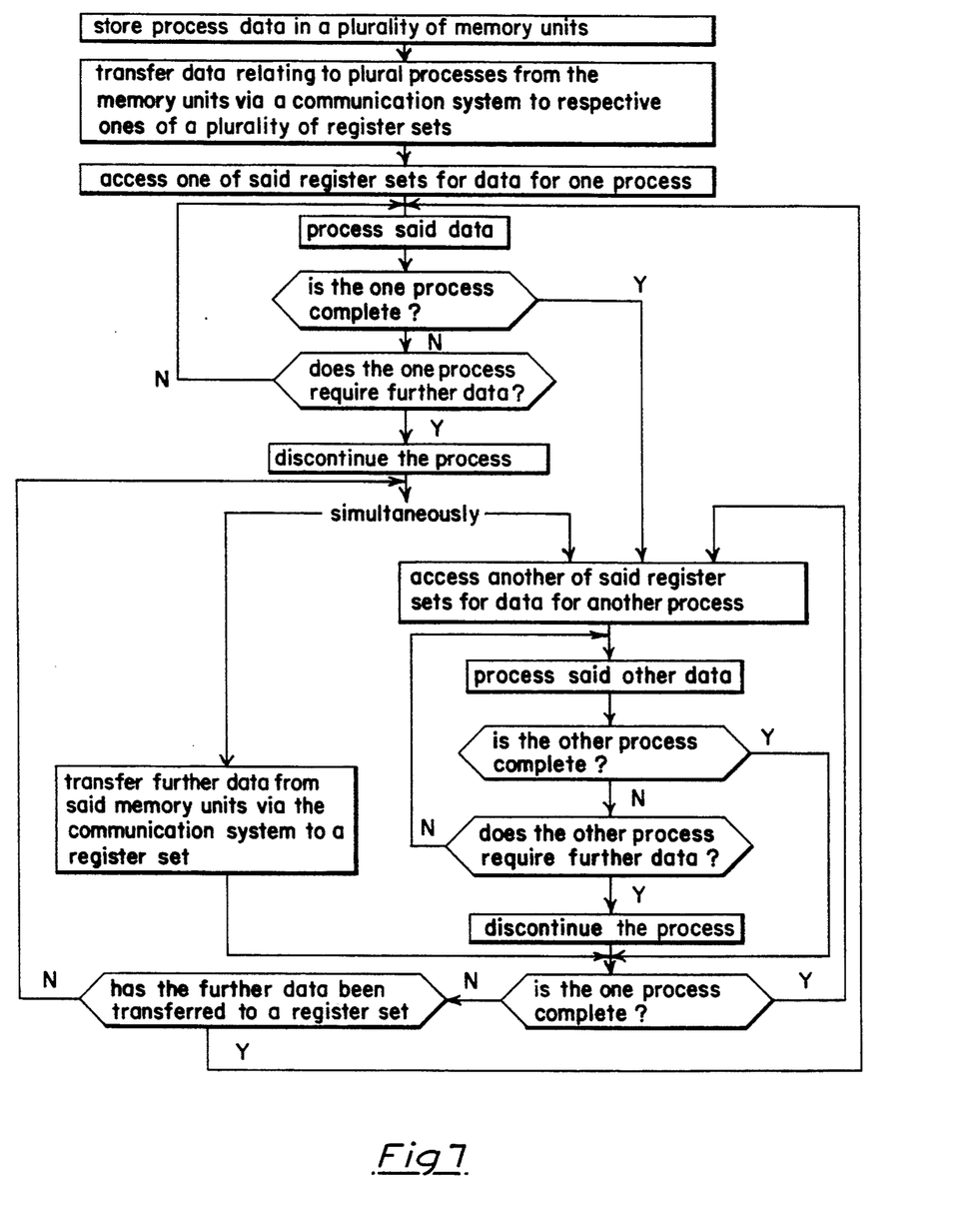
FIG. 7 is a flow chart depicting the operation of a processing unit.

FIG. 7 is a flow chart depicting the operation of a processing unit.

The system illustrated in FIG. 1 is particularly adapted for pipelining. This technique allows overlapping execution of the different phases of several consecutive instructions. Thus if each instruction requires 5 phases (numbered 1 to 5), when executing instructions A, B, C . . . it will perform phase 1 for instruction A then overlap the performance of phase 2 for instruction A with phase 1 for instruction B, and so on, getting the pipeline full with the states A5 B4 C3 D2 and E1. This has the advantage that all the components forming a CPU are used simultaneously rather than sequentially. Problems occur in traditional systems when the results of instruction A is required as an input to instruction to B or C, and when a B is a conditional Jump, which cannot be carried out until the result of A is known and makes it difficult to decide where to find instructions C, D etc. For the CPU of any of the system described above, a modified version of pipelining may be implemented, wherein each pipeline stage belongs to a different Context. This ensures that the results of one instruction cannot affect the others whilst still gaining the greater thoughput of a pipelined architecture. Thus, the routers are arranged to direct a first received packet to a first selected output port while simultaneously directing a second received packet to a second selected output.

It will be appreciated that in the system illustrated in FIG. 1, send and receive buses SB and RB and routers R are used in place of the system bus which provides the memory access path in a conventional computer. In distinction to conventional micro-computer buses, each message goes into one or more routers, where it is buffered and may be stored for a period before emerging from the other side, whereas in a conventional microcomputer the bus passes alongside the equivalent units and is connected electrically to all at once. In the system illustrated the number of bits necessary to make up a complete message may be greater than the number of conductors connecting the routers and therefore each message may and usually will consist of several transactions. As the messages are buffered in each router, several messages may exist at the same time on different parts of the bus SB or RB, following each other along it. When a message reaches its intended destination, the router connected thereto removes the message from the bus and passes it to the destination. In the system all the connections are short, and so transmission from one router to another may be faster than in conventional buses. The time taken for any single message to travel out via the send bus SB and back via the receive bus RB is longer than in conventional systems, but this is not disadvantageous because the use of multiple contexts allow the total throughput of the buses to be higher than in conventional systems, since many messages may be travelling simultaneously along each bus; furthermore, there is no quiescent period between the transmission of a request and the reply while the memory is accessed.

Figure 3:
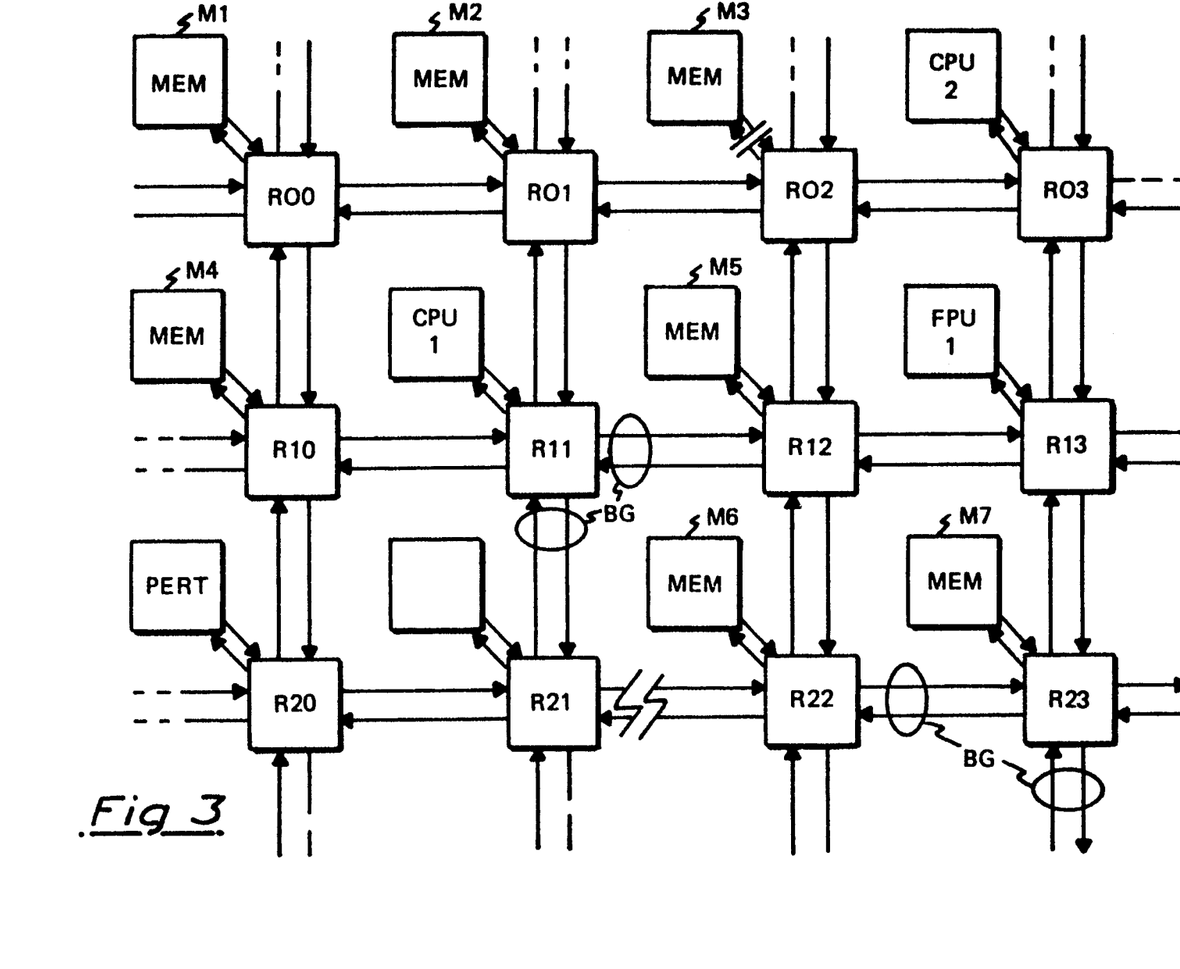
FIG. 3 shows a processing system having a communication system configured in a two dimensional grid.

FIG. 3 illustrates a development of the FIG. 1 system using multiple system buses to allow the number of CPU's to be increased beyond the point at which the send and receive buses of FIG. 1 could become saturated. The system illustrated in FIG. 3, comprises multiple CPU's and memory banks plus one or more FPUs as in FIG. 1, together with a peripheral unit PER. The CPU's, memory banks and the FPU are denoted by similar references as in FIG. 1. However the three channels of each router have been extended to a total of ten, five in and five out, so that the sections of bus form a bus grid BG providing multiple alternative routes between the various units. The bus sections at the edge of the grid may be flagged as unuseable or may be wrapped round to the opposite edge.

In this form of the invention requests originate in the CPUs, and replies in the memory banks M and the FPUs, as before which are passed along one of the respective diagonal links (bus sections) to the appropriate router R. From there the message is passed from router to router, as in FIG. 1, unless it reaches its destination; except that in each router a choice of three routes out is available. The destination is identified by the number of steps to be taken in different directions such as "2 north" and "4 east". The router will pass the message to an adjacent router either north or east, as it may select depending on other traffic. The destination identity is then updated at each router until the router at the desired destination is reached where the message is passed up the diagonal bus section to the attached unit or memory bank. A request and a reply do not necessarily travel by the same path in opposite directions, though in general the two messages will travel by similar paths.

A router is arranged to pass messages between any pair of input and output ports, regardless of what other channels may be doing. If a message arrives for any channel which is already in use, the router either stores the message or delays input until the output is available. To avoid grid lock each router has sufficient buffering to store a complete message.

Figure 4:
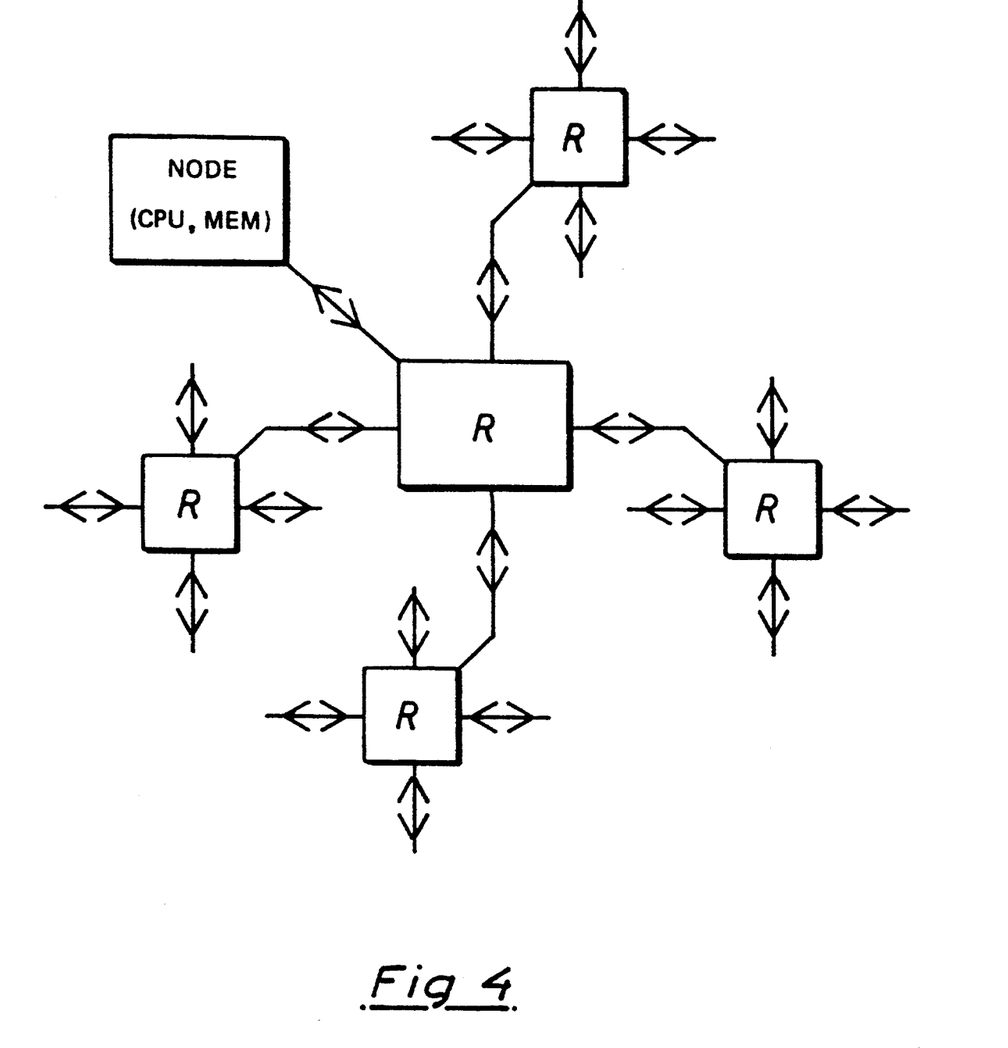
FIG. 4 shows a node of a communication system configured in a hypercube.

Modification can be made to the arrangement of FIG. 3. Other grids such as hexagonal, cubic, or hypercubic may be used instead of a square grid. A node of a hypercubic structure having sixteen dimensions is shown in FIG. 4 configured from ten port routers. The square grid form may be simplified by making "streets" one way, alternating north and south or east and west. The active units, namely the CPU's FPUs etc, can be connected to nodes in any mixture required.

In systems such as described, the normal interrupt facility usually provided in computers is not required. A peripheral unit may stall a process by failing to reply to a message until it desires service. Provided enough contexts remain to keep a CPU occupied, no degradation of performance results. However, some means is desirable to unjam a stalled task after a time out. Conveniently message routing is achieved by coding the first byte or bytes to define the signed number of nodes north (or south if negative) and east (or west if negative) the message has to travel. As the message travels these counts are incremented or decremented as appropriate. When both counts reach zero, the destination has been reached and the message is routed to the local unit. The return address for any request may be enclosed with the message itself or may occupy a fixed position within the message and be modified as the message travels in exactly the inverse manner to the main routing. If the return address is initially set at zero, the return address will automatically be the same as the request address.

If a message being routed as described above has some distance to travel in both the N/S and E/W directions, the router is free to chose either direction according to any algorithm. Particularly, if the output port in one direction is in use, it should chose the other suitable direction. However, when the number of steps to go in one of these directions has dropped to zero (i.e. the correct row or column has been reached), it should normally send the message only in the direction which will reduce the remaining offset to zero. The message is preferably never routed off the correct row or column, even if the desired port is currently in use, because any such sidestep will have to be reversed later which will probably take longer than waiting for the desired port to become free. However, there may arise a requirement for the grid in FIG. 3, to be partial i.e. for some nodes to be completely missing. In such circumstances the router must be aware of this fact. Obviously it should never route a message to such a non-existent grid point, thus, the preceding rule is then overridden and the message may be routed "sideways". In such circumstances it must never be routed to the node from which it came, even if this appears to bring it closer to its eventual destination.

As previously stated, it is desireable to provide means for unjamming a stalled task, which usually occur due to a fault. There are two sorts of fault against which it is necessary to defend: soft and hard faults. Soft faults are transient errors which typically corrupt only a single bit or a small group of related bits, and result from such causes as noise or alpha-particle corruption. Soft faults occur infrequently and randomly. There are numerous techniques for combating soft errors (by increasing redundancy with parity bits etc) but all of these will eventually fail. Hard faults are component failures which, once they occur, are essentially permanent.

Soft faults can be corrected, provided that they are detected, by retrying the operation which faulted. At the level of detail considered here, the main problem is to be certain that all soft faults are detected. There are two known ways of dealing with hard faults: parallel hardware and checkpointing. Parallel hardware depends upon every system component or subsystem having a duplicate which can take over if the primary component fails (provided of course this failure is detected). This technique requires expensive hardware duplication. Checkpointing also requires multiple sets of hardware (so that one set will still work when another fails) but allows all the different sets of hardware to run independently in the absence of an error. It is primarily a software-based technique which can readily be applied in a computer embodying the present invention and involves dividing each context or task up into a number of separate operations which are carried out in sequence, and between each pair of operations ensuring that enough data is stored (checkpointed) that if an operation fails it can be restarted from the checkpoint. For both methods the primary requirement is that errors are detected in order to trigger either the use of replacement hardware or the rerunning of a task from its last checkpoint.

Errors in the Packet grid manifest in two forms, corruption of packets as they travel round the grid, and nodes dying while in use; the former will be considered first. A so called "heartbeat" clock signal is present in all nodes of the grid which ticks with a period of the same order of magnitude as the time taken for a packet to cross the packet grid. It need not be synchronous, but it ticks at the same rate at each node. Packets being routed round the packet grid may be corrupted as they pass from router to router and it is essential to detect that this has occurred, which can be done simply be appending to the packet a check value or CRC. However it then becomes a problem as to when to check the CRC and what action to take on failure. Since packets are passed from router to router as fast as possible, it should be rare for a router to hold all of one packet in its internal storage. By the time the CRC has arrived, been checked, and found faulty the head of the packet could have been passed through several further routers. It is therefore necessary for the receiving router (which would switch the packet into its destined CPU, FPU or memory) to check the CRC and discard packets which have become corrupted. By contrast it is easy for the receiving node to detect a faulty packet and ignore it.

When a packet has been discarded because of corruption, in order to ensure continued operation of the system it must be retransmitted. There are three approaches to this, the third of which is most reliable.

The first approach is for each packet to contain the originating node address. The receiver of the packet could then send a retransmission request to the originating node. This has the disadvantage however that it may be the originator address which as become corrupted.

For the second approach, the routers have output FIFO's in the form of a ring buffer. A new signal, BadPacket, is added to the router-to-router interface which says that a packet was misread by a receiving router. The receiving router calculates the CRC as the packet arrives (while still passing it on as fast as possible) and if the CRC indicates a fault, it inserts BadPacket at the end of the packet. The router (the one transmitting the packet) is modified so that it keeps the outgoing packet in its ring buffer (i.e. does not allow incoming data to overwrite it) until the packet has been transmitted. If BadPacket is received at the end of the packet then buffer pointers are manipulated back to the start of the packet, which causes the packet to be retransmitted, and if BadPacket is not received the memory containing the saved packet may be overwritten. The corrupted packet will continue on to its destination, where it will be discarded, while following close behind will be a correct copy. This approach achieves the fastest possible retransmission if faults occur in the data stream, however, it is vulnerable to faults in the control signals PacketStart, NotReady, and BadPacket.

The preferred mechanism for fault correction is for every packet to have a reply and for the sender of a packet to wait, with a timeout, for a reply. The mechanism for doing this is explained below. If the reply is not received within a fixed period, the request is retransmitted. The content of packets must be such that it does not matter if the replying node receives two copies of the same request (because the reply to the first request, which arrived uncorrupted, was corrupted in the return Journey and therefore destroyed).

One corrupt packet mode still remains to be considered. If the routing information at the head of a packet is corrupted, it will be routed to the wrong node. If this is a valid node, the packet will be destroyed when its incorrect CRC arrives (the routing information must of course be included in the CRC). However, the node to which it is incorrectly routed may not exist or may be dead. In this case the dead node handling of the routing system will cause the packet to bounce around the grid, continually attempting to reach the desired node but being deflected upon reaching a dead node. Such a packet would tend to wander the grid indefinitely, and for ease of reference is called a ghost packet. A modification to each router could cause it to destroy packets addressed to adjacent nodes which are flagged as dead. However, this does not cater for the case where the addressed dead node is on the centre of a block or right outside the area of grid which actually exists—the router cannot know if it is really dead or if an apparently dead node is merely blocking the direct path to a live node.

Node failures (which include router failures, because a node is marked as dead if either its local resource or its router is not reliable) can also generate ghost packets. It is a requirement of the implementation of the invention that when a node fails, it produces (by default) "dead" signals to all its adjacent nodes. This will stop messages being routed though it. However, messages may be generated which are addressed to the failing node, either replies to messages originated at this node or messages from other nodes not yet aware that the particular node has died; these now become ghost packets.

However the heartbeat clock enables the router to detect and dispose or ghost packets as each packet is timestamped on transmission from a node with an expiry time, derived by adding a value safely longer than the maximum possible transit time to its current heartbeat count. Each router then compares this timestamp with its own heartbeat and if the current time is greater than or equal to the expiry time (remembering to allow for counter wrap around) it destroys the packet. If the heartbeat is slow enough (much longer than normal router-to-router transit time) a simple comparison for equality may be adequate. It does not matter if very occasionally good packets are destroyed because they have travelled too slowly—this registers as a soft error. An alternative implementation is for the sender to timestamp with its current heartbeat and destroy the packet if the difference exceeds a certain value.

An alternative solution to the problem of ghost packets is to include in the packet a node count which is decremented as it passes through each node. The router will then kill the packet when it reaches zero. This is more accurate, killing the message sooner after it fails to reach its destination, but it involves altering the message in each router. This has repercussions on the speed and complexity of the router and means that the CRC must be recalculated for each transmission.

It is very important that the heartbeat clocks of all the nodes are always very nearly the same. The error correction schemes outlined allows for recovery from very occasional errors in the clocking of the packet grid but this requires an absence of errors in the heartbeat clock, or a mechanism for stopping such errors piling up by resetting clocks to the same value before they creep too far apart. Preferably a broadcast mechanism is available on the packet grid which can be used to reset the heartbeat clocks in the nodes to the same value. In fact, this mechanism could be used to distribute the heartbeat to all the nodes (i.e. a single master node distributes a new heartbeat value to all other nodes at regular intervals). Each node feeds the heartbeat value to its associated router. This avoids the high cost of making the routers interpret broadcasts.

The timeout with which a node decides that a message has got lost should be at least twice the timeout allowed for the message to be received (though it might be useful for reply packets to inherit the time out of the packet to which they are a reply, in which case the node timeout should simply be greater than this value). When the node detects a time out it should retry at least once and preferably more times which may be done at a microcode or a software level. If successive attempts to send a message fail it should then take whatever action is appropriate for reporting that a node has died and trigger recovery actions such as restarting tasks from their latest checkpoint.

One mechanism for broadcasting the heartbeat is to have a specialised packet to carry it. On receipt of such a packet, the node compares the new heartbeat with its current values. If the value is different from its current value, the node would then alter the current value and send a copy of the new heartbeat packet to all the non-dead adjacent nodes, with the possible exception of the node from which it received the new value. If the value has not changed, no action is taken.

Systems according to the invention are multi-tasking with each CPU performing a multiplicity of tasks, one within each context, and there may be other tasks which are quiescent while waiting a free context. In such a system it is necessary for different tasks to communicate and interact in a controlled manner to avoid one task seeking access to a datum while another task is in process of modifying it. The problem is resolved by the use of spin locking.

To achieve the spin locking, it is necessary for the memory access device to provide an indivisible read/write mechanism effective for each CPU, whereby the CPU reads the contents of a memory location and writes to it a new value in a manner which is guaranteed to be indivisible, e.g. by the system bus architecture or the store architecture. In this way no other access to that particular location will occur between the two halves of the read/write cycle. In the present architecture this could be implemented by a new packet type combining a read and a write packet. For each memory bank or other resource to which undisturbed access is required, a particular memory location is allocated as a lock location. This has two settings; "unlocked" (usually zero) and "locked" (non-zero).

A task wishing to lock the resource performs a read/write cycle as described above, writing the "locked" value into the location. The value read is then inspected; if it is the "unlocked" value then the task has successfully claimed the resource; if it is the "locked" value then the locking task has failed to claim the resource. If the attempt to lock fails, then the locking task must pause for a while and try again, repeating (hence "spinning") until it succeeds, or until it gives up. Once the lock succeeds, the resource can be used freely and is released simply by writing the "unlocked" value back into the lock location.

If an indivisible read/write is not available, it can be replaced by a specialised store location which will allow only: (a) the writing of a non-zero value when its current contents are zero, or (b) the writing of a zero at any time. A task desiring to lock a resource writes its own unique (non-zero) identifier to the location then reads it back; if it reads back its own identifier, it has locked the resource. If not it has failed to lock the resource and, as before, must back off for a while and try again.

The disadvantage of spin locking, in whatever form, is that valuable processing time and memory bandwidth is consumed repeatedly attempting to lock a resource which is already locked. If several tasks by chance all attempt to lock the same resource, the system can fill up with frustrated tasks whose very attempts to lock the resource are impeding the running of the current holder and delaying its eventual release. By delaying longer between lock attempts the load is reduced, but then the system can go "soggy" because of the long period after a resource is released before the next user accesses it.

An alternative mechanism can be provided in the architecture, according to the invention, by making one of the processes into a lock manager. This inverts the normal sequence of operations for a CPU, that being to run a process until it requires access to memory or some other resource such as a Floating Point Unit. A packet is sent to the appropriate resource and that Context ceases to be runnable until a reply is received, control passing to another Context. In this inverted mode the Context is idle until it receives a resource request packet from another (non-inverted) Context, which may be in the same or another CPU. It then attempts to allocate the resource, returning a successful reply packet if the resource is not already allocated. The difference comes when the resource is already in use; the lock manager then simply fails to reply until the resource is released, storing the identity of the unsatisfied requester in its internal storage. When eventually the resource is released, the identity of the next requester is pulled out of internal storage and an appropriate reply packet sent. The resource is freed by sending a single Release Resource packet.

With this mechanism the only overhead for resource allocation is a single exchange of packets. If the resource is unavailable, the requesting Context simply hangs in an unrunnable state until the resource comes free. A context is used as a resource manager, but contexts (as opposed to CPUs or bus bandwidth) are assumed to be a cheap resource, and a single manager may manage multiple resources.

A particular benefit arising from the invention is ease of manufacture. All the components of an arrangement such as illustrated in FIG. 3, already wired together by means of the bus grid, can be fabricated on a single wafer of silicon. Previous attempts to do this have not produced acceptable results because it is currently impossible to avoid defects in the crystalline structure of the wafer which results in individual circuits not functioning. Conventional computers are inoperative in such a situation but, using the inventive architecture described above, the computer is able to function having random components in a non-functional state.

Another problem of wafer scale integration, in the case of conventional computers, is that conductive connections on silicon have a very high specific resistance. It is therefore difficult to have conductors which run long distances across the wafer. Such conductors also have a large area, which is more likely to be hit by a defect. The inventive architecture reduces both problems. Defective "conductive" areas can be tolerated by making modifications to the router as described above. Some means is however required to signal to the routers adjacent the defective units that they are missing and messages are not to be sent to them. This can be done by fuses, laser trimming or other similar techniques. Moreover, in the architecture there are no long conductors to cause problems. In FIG. 3, the memory bank M3 is indicated as being non-functional, whilst one bus section of router R21 is also indicated as defective. Routers such as R11, R20 and R22 are in this case provided with means to indicate that R21 is inoperative.

A computer embodying the present invention may be configured to run conventional (procedural-type) programs and emulate familiar environments for high level programs. However it is also possible to build a dataflow architecture computer. A dataflow computer is a known techniques but, by using the techniques described herein it becomes possible for both parocedural and dataflow system to run simultaneously on the same hardware.

In a Procedural machine, a procedure (the program) fetches the data it needs to operate on, however, in a dataflow machine it is the data which fetches the algorithm it needs operate upon it. The general form of an instruction is of the style <Vat> is <amount> times <vat percentage>

<invoice amount> is <amount> plus <vat>.

The items in angle brackets (e.g. <vat>) are the data which flows through the system, and the other sections are the algorithm. The principle is that as soon as both <vat> and <amount> are available, the machine automatically calculates <vat percentage>. The appearance of <vat> then triggers the second instruction (since <amount> is already available) to calculate <invoice amount>. The appearance of <invoice amount> might then trigger the printing of an invoice.

Dataflow machines can be of two types: demand driven and supply driven. The example above is supply driven: the supply of all the operands to an expression triggers its calculation, regardless of whether it is needed. A demand driven system does not calculate any results until they are wanted. Such a system requires a mechanism for communicating a need for a datum e.g. <invoice amount> to an expression which calculates it, then, if the inputs of that expression e.g. <vat> are not available, propagating that need to the expressions which calculate these operands and so on. Thus, in the example above, the appearance of <vat> and <amount> would trigger no action. An extra stimulus, the need for <invoice amount> would be needed. This would trigger the second instruction. This could not be evaluated because, although <amount> is known, <vat> is not known. This therefore produces a demand for <vat> which triggers the first instruction. Since we have assumed that the two operands of this are available the instruction is evaluated which then cause the second instruction to be evaluate and the desired result is returned. If they were not available further requests would be triggered and so on until the expression could be evaluated. Furthermore it is simple, as will be explained below, to convert a supply driven machine into a demand driven machine.

Dataflow machines are well adapted to Artificial Intelligence applications since they do not demand that all possible data be supplied nor in any particular order because the system will make whatever deductions are possible with the information supplied, and can be set up to request extra data if this might be useful. This maps well onto fourth generation languages such as Prolog. Secondly, Dataflow machines are inherently parallel. The appearance of a single datum can trigger the evaluation of many expressions and the demand for a single output can trigger many requests for evaluation. Each expression is usually simple to evaluate and can be carried out (once its operands are available) without affecting any other which is consistent with the distributed architecture of the present invention.

A dataflow instruction in memory has a number of components:

(a) a flags word defining which operands to the expression have not yet been calculated;

(b) means of describing the algorithm to calculate the result of the instruction;

(c) means to locate the operands to the instruction (e.g. their addresses), (d) the result of this instruction when calculated, (e) means of identifying all the instructions which use the output of this instruction as operands. Thus the memory includes a flag field, a value field, an output list field, and an operation field to provide supply driven operation.

The critical component is the flags word (a). There must be a limited maximum number (perhaps 8, or maybe 32) of operands for each instruction, each of which has one flag associated with it. These flags are set up when the software is loaded so that all the flags which represent valid operands are (say) set while the rest of the word is clear. A new packet type is then required, an Operand Ready packet, which identifies a single bit within the flags word. This travels in the usual way via the packet grid to the controller of a particular memory and identifies a single flag within a flags word. The memory controller clears the relevant flag and if this does not clear the whole flags word nothing further happens. If however the whole flags word has now become clear, indicating that all the operands to the instruction are now available, the instruction is triggered. In this case, the memory controller must initiate the calculation of the instruction result. A simple way for this to happen is for the means for describing the algorithm (b) to be simply a packet which is despatched into the grid when the flags word is cleared. This packet would then trigger some action by the machine in its Procedural mode. The exact format of this packet (a Dataflow Trigger packet) depends upon the nature of the Procedural machine but in general it will cause a task to be started which will locate the operands (c) and calculate the result. This result is then returned to the correct position in the instruction (d) and the list of users of this result (e) is scanned and to each of them is sent an Operand Ready packet stating that this operand is now ready. These packets can in turn trigger the whole cycle again.

The description above is for a supply driven machine. To convert it into a demand driven system, three further additions are needed. The first is to add an extra flag to the flags word (a), which has no operand but specifies that the operand is wanted. If this flag is set, the arrival of the last operand will not trigger the instruction because the flags word is still not clear. Secondly, a new item (f) comprising means for identifying the instructions producing the operands to the current instruction is added to the instruction. Thirdly, a new packet type, Operand Wanted, is needed which identifies the instruction flags word. When this arrives at the memory controller it clears the extra, Wanted, flag. Thus, the memory includes a flag field wherein one of the flags of said flag field is a value wanted flag, a value field, an input list and an operation field to provide demand driven operation. If the flags word is now clear, this triggers evaluation of the instruction in the way described above. If however the flags word is still not clear, it is scanned to see which operands are still lacking (i.e. which flags are still set) and for each flag still set, it extracts from the list (f) the location of the input instruction and sends an Operand Wanted packet to this instruction.

In both the above cases, action is normally taken on clearing a flag only if the flag was previously set. In the case of Operand Wanted packet, this generally true. In the case of Operand Ready packets, some architectures might allow multiple triggering of an instruction, for example so that it is triggered every time a new value appears for one of its operands; it might even be desireable for this to be controlled on an instruction by instruction basis, e.g. as part of the Operand Ready packet.

As described above, the appearance of a single operand or a request for a single operand may trigger an essentially open ended amount of processing. It may be helpful to provide some limitation to the amount of processing which can be triggered by a single request. This can be done by attaching a count of levels to the Operand Ready or Operand Wanted packet. This is decremented at each memory node before being passed on to any further "ripple" packets which have been generated. When this counter drops to zero, instead of generating further "ripples", a different packet must be generated which informs some central resource of the instruction at which processing stopped. It is then possible to evaluate how much processing has been generated by a single operand, or request, and to control roughly (though not precisely, because the amount of fan-out at each stage is uncontrolled) how much computer power is being consumed.

It may also be useful to know when the activity generated by a particular request has been completed. This is achieved by having a second set of flags paralleling the first; each instruction will send an acknowledgement back when it has completed processing either a Ready or a Wanted packet. In the case of the Operand Ready packet, if the instruction is now triggered the reply is not sent until the instruction has been fully processed and the reply has been received from all "rippled" Operand Readys. Similarly, to Operand Wanted packets, the reply is not sent until the replies have been received from all "ripple" Operand Wanted packets. This means that each packet will not be replied to until all the subsequent activity has been completed. The receipt of a reply to the initial message means that the activity triggered by that massage has completed. If the process described above of limiting the number of ripple packets is in use, when a ripple packet is suppressed, because its counter has reached zero, no reply is expected so that the packet which generated it may be replied to instantly.

When conditioned to operate as a Dataflow machine the computer also operates as a Procedural machine to interface to the real world (e.g. accept input, whether operands or queries, and print out the result). The Procedural system can trigger the Dataflow system by being able to despatch Operand Ready or Operand Wanted packets. The converse transition already happens automatically, since the evaluation of instruction results is done in the Procedural domain. The code fragment which evaluates the results may perform operations such as signalling semaphores or sending messages in order to stimulate conventional Procedural tasks to do whatever it needs.

Implementing this aspect of the invention requires a significant amount of extra functionality from the Memory Controller. However, if this is implemented initially as a microcoded machine, this is simply extra microcode and the cost is small; remembering that the memory is relatively slow dynamic RAM therefore the memory controller can be relatively slow.

Figure 5:
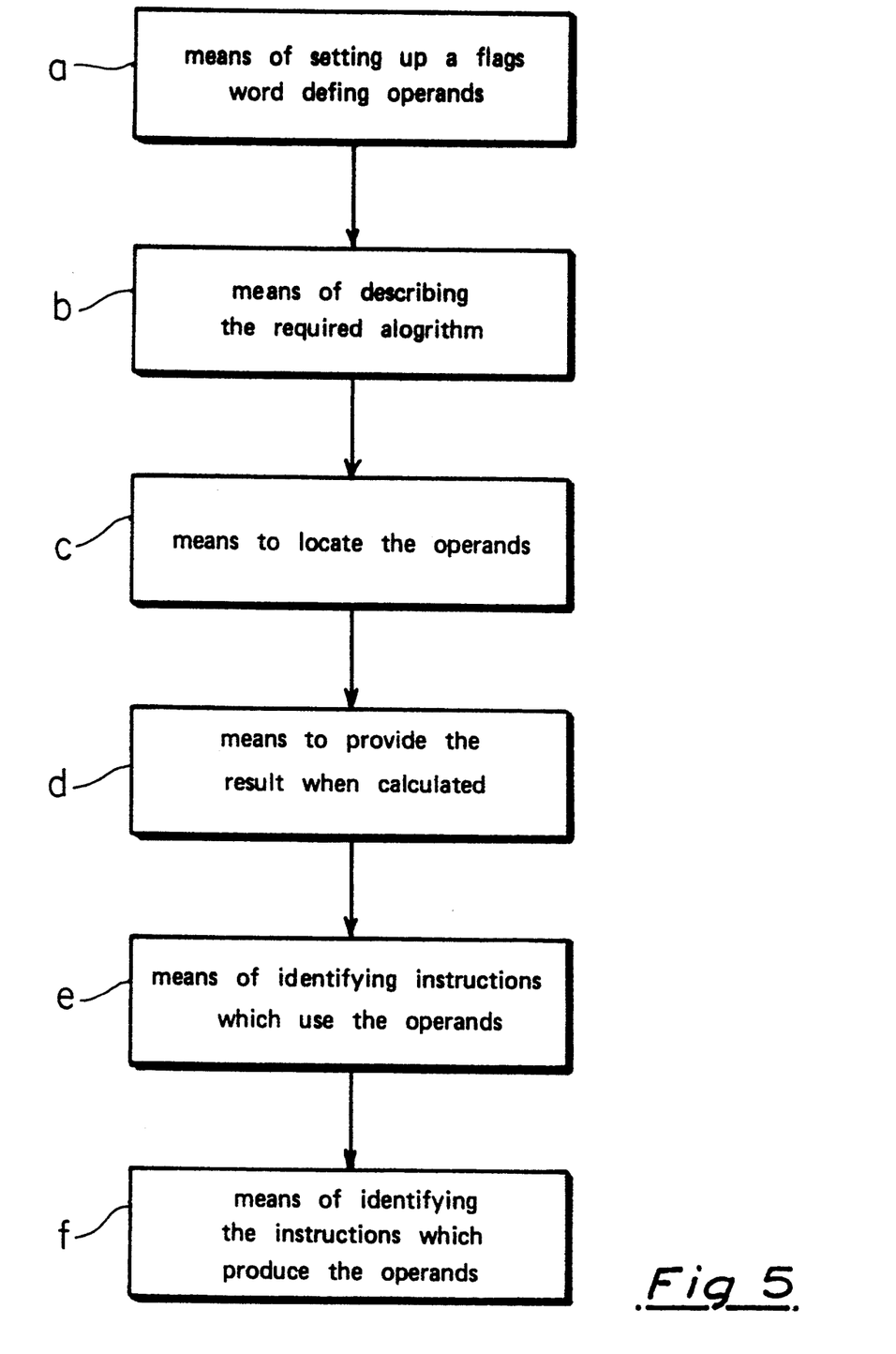
FIG. 5 shows the operations of a dataflow processing system.

Thus the computer may be arranged to provide both Procedural and Dataflow operation, sharing the same hardware resources. A functional diagram of a computer according to the invention and arranged to operate as a Dataflow machine is shown in FIG. 5.

In order to organise the computer for Dataflow operation, the provision required for implementation may be in the form of firmware, hardware or a combination of the two. The provision is permanent in the computer, and is different in kind from a program prepared to carry out a given procedure on input data. The packet grid need not be a rectangular grid although this facilitates routing since an address can be regarded as X and Y coordinates. The packet grid may be of other configurations e.g. tetrahedral and in general a packet address may be an arbitrary number. In this case each router may be provided with a look up table which identifies, in response to each address, the best and second best way (say) of sending in the package to its ultimate destination.

So far the nodes have been assumed to be heterogeneous, that is to say nodes such as CPUs and Memories, for which the packet must get to the exact node to which it is addressed. The alternative type is Homogeneous nodes, which essentially provide services—an example might be a floating point ALU. Homogeneous nodes of the same type are essentially interchangeable—a floating point operation can be performed on any floating point ALU. In the lookup-table address scheme described above particular addresses can be allocated to classes of homogeneous nodes. Each router is then programmed to route packets addressed to a Homogeneous node to the nearest such node (with second choice if the nearest is busy). This means that the CPU nodes do not need to know where such shared resources are in the grid—the routers will automatically send a packet on the nearest available resource.

This concept can be used to extend the available network by introducing the concept of a Zone. A Zone is a group of adjacent nodes, each of which has a unique address. The grid may contain many zones, and the node addresses are repeated in each zone. The zone itself is treated as a Homogeneous resource, with its own address. All routers have their lookup tables set up to allow them to direct a packet towards this zone. When it reaches the correct zone, the packet must be routed to a node which strips off the first routing code. This will reveal a new routing code behind it, which will contain the address (unique within this zone, but not within the network as a whole) of the node to which the packet is to be delivered. The operation of stripping off the head of that packet is essentially a "no-op" and can be performed by many different classes of node (again, the routers will only pass such a message to nodes capable of handling them—at least one such node must be present in each zone).

This organisation can be repeated, with super zones over zones and so on. In the limit, a n-bit address can allow a network containing 2 to the power 2 to the power (n−1) nodes (though this will be slow, because the packet will have to have n−1 prefixes). For an 8 bit address, this yields 2 to the power 128 nodes, 64 zones of 256 nodes would give 16K nodes.

The data processing apparatus defined by the first aspect of the invention comprises processing units, memory units and a communication system. A preferred communication system is defined by the second aspect of the invention in which routing means have input ports, output ports and first-in-first out memory devices. The preferred communication system then consists of arranging the routing means in a grid, referred to herein as a packet grid. In addition to the particular application, defined by the first aspect of the invention, this packet grid architecture may also be adopted in the design of a local area network, LAN. In a LAN signal paths between routers are typically tens or hundreds of meters apart, and consequently the data transfer speed is less than that of the computer system. The wring of such a system is quite straight forward, given that signals are unidirectional along each conductor and only drive a single load. To reduce costs the width of buses may be reduced to, for example, eight bits compared to the preferred sixteen or thirty two bit buses of the computer system.

The concept of having distribution levels, termed zones, in which destination words are stripped off has been described with respect to the computer system. This may also be applied to area networks in which a plurality of LANs are connected by second level nodes. Packets transmitted between second level nodes are headed by a second level destination word which is preferably stripped off before being supplied to a local network, whereby the local destination word then heads the packet. This may be extended to provide as many levels as required, although other forms of communication may be preferred once the distances become very large.

The system has several advantages over conventional LANS. Most current LANs have a fixed bandwidth. This means that excess bandwidth must be purchased if further expansion is anticipated, and once a LAN is fully loaded it cannot be expanded. The present system allows for extra paths to be inserted (transparently to the user) over high load sections without requiring the whole network to be upgraded. Current LANs have a fixed topology—Ring, Bus etc, but the present system will support a random topology, allowing it to be matched to the physical topology of a site or to the logical topology of an application (by providing multiple paths where high loads are expected and single paths for rarely used channels). Unlike some LANS, overrun (where data is lost because the receiver was not ready for it) is impossible. If a receiver is too slow the data simply backs up. Data in the rest of the network than automatically diverts around the blockage. The fault tolerance techniques described above make the system reliable and easy to update while in use.

Computers connected to the grid may be of the present type then, given the ability to connect together two grids running at different speeds, the distinction between one computer and another on the LAN blurs. Given suitable processor and operating system architectures a task running in one location could access, via the LAN, memory in a remote location as if it were local (apart from the delay) thus vastly reducing the overheads in both locations. This means that the set of all computers connected to a LAN may, in certain circumstances and if so desired, be considered as a single computer whose physical size and processing power would be considerable.

Essential components of the routers are the first-in first-out memory devices. These may be of any construction which performs a FIFO function. Preferably the FIFO's are of the randomly addressable type in which the read addressing and write addressing circulate, becoming out of phase when data is buffered into a FIFO. In this way, the FIFO only introduces one clock period of delay when no buffering is required.

As previously stated the routers "know" which are the first and subsequent choices of port to output a packet to any given destination. The router must contain within it a register or group of registers form which it can calculate, or look up, the correct port for any given destination, and these registers must be set to different values for each router to reflect its different position in the grid. One way to do this is to hardwire it in, by fixed lookup tables in a Prom or by setting node addresses on a switch bank. This is undesirable because it has to be done manually (with all the possibilities of human error), and because it is then not possible to replace a faulty router without first reprogramming its replacement. It would be desirable to have some means whereby the grid could be automatically configured from identical devices without manual intervention.

To achieve this, a small number of special codes are built in to the router. These special codes always route the message in a fixed direction (e.g. turn left, straight ahead), or to the router on-board registers. Furthermore, as they do so, the special code is itself deleted from the front of the packet. These special codes will allow a configurer, which may be an external computer or a preconfigured part of the grid, to program the routing for the rest of the grid. It does so by sending out packets with a number of prefixes which direct it to a specified node, being stripped off node-by-node as they go until the node to be programmed is reached, when the data for the on-board registers will be revealed in the residue of the packet. Furthermore, if the grid geometry is known to be regular (e.g. the rectangular structure of FIG. 3) but of unknown extent or with potential defects, the configurer can explore the grid by sending out packets which go to a fixed router then attempt to return—if they do so the router and the fixed path both exist.

Figure 6:
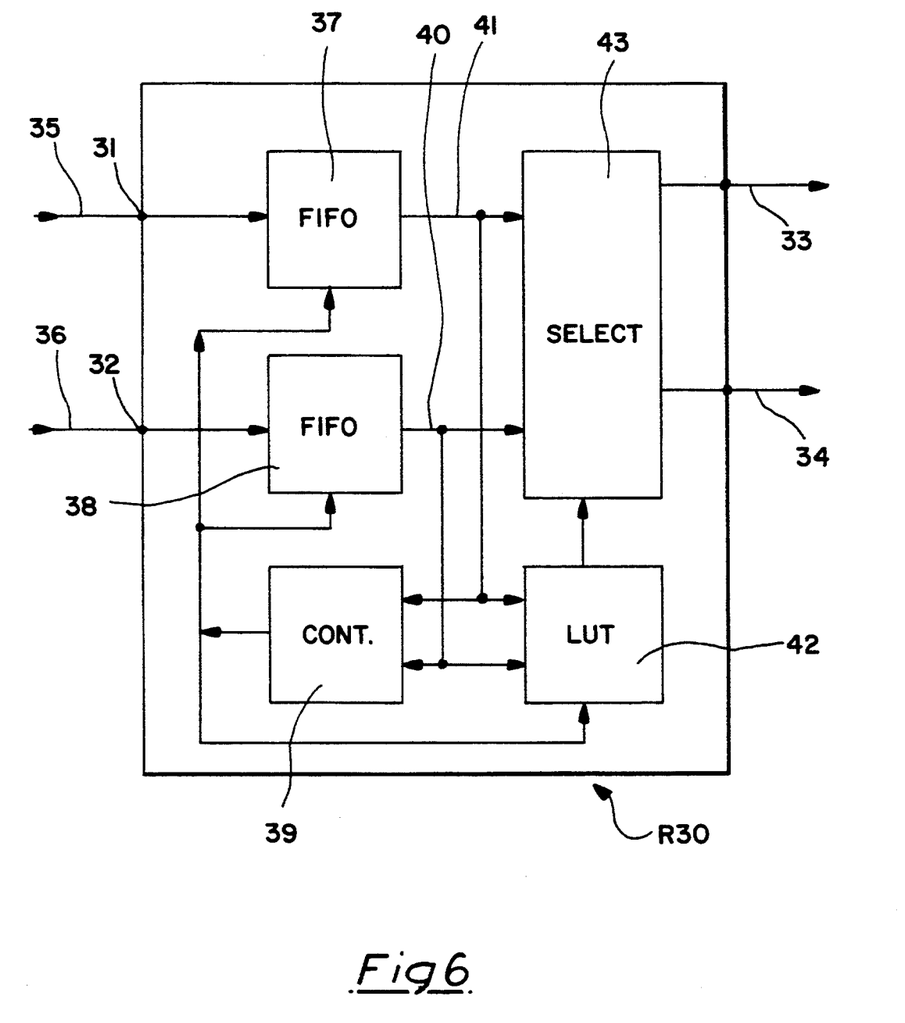
FIG. 6 shows the architecture of an exemplary router.

If the geometry is irregular, a further register and special routing code must be added to the router. The register is an identity register which, when the system is powered on, is automatically set to an "unidentified" value. This register can be programmed in the same way as any other of the router registers, as described above. A special routing code is designated as a "Read Identity Register" code. It causes the packet which it heads to be routed back to the direction form which it came, and is automatically deleted in the same way as other special codes. However it also causes the current setting of the Identify register to be appended to the packet. This will allow the configurer to detect where connections are made to routers it has already encountered and to recognise unknown routers when it encounters them. The router R30 shown in FIG. 6 comprises at least two unidirectional input ports 31, 32 and at least two unidirectional output ports 33, 34. As shown previously in FIG. 3 each input port 31, 32 is connected by respective transmission line 35, 36 to a respective output port of an adjacent router (not shown in FIG. 6). Each of the input ports 31, 32 has a respective FIFO 37, 38 which performs a first-in-first-out storing function. The FIFOs are provided to receive data packets from the input lines 35, 36 in the form of a plurality of temporally separated words including a word identifying the destination of the packet. The data lines 35, 36 each comprise parallel lines, for example eight or sixteen or thirty two lines so that each word, which comprises a plurality of digits, can be transmitted in parallel over the lines. The router R30 also comprises a controller 39 which is connected to the outputs 40, 41 of the FIFOs 37, 38 and is responsive to the destination word to control the FIFOs to prevent them transmitting data when a data collision situation could arise. The outputs 40, 41 of the FIFOs are also connected to a look-up table LUT 42 and to a selector 43. The LUT 42 is responsive to the destination word, subject to control by the controller 39, to output control data that causes the selector to connect either line 40 or 41 to either line 33 or 34 depending on the destination of the packet. Thus, the LUT 42 and the selector 43 together serve to direct packets selectively from one of the FIFOs 37, 38 to one of the output ports 33, 34.

I claim:
1. Data processing apparatus comprising:
   a processing unit;
   a plurality of memory units separate from each other and from the processing unit;

a communication system connected to said processing unit and said memory units to provide communication therebetween, wherein said processing unit includes:

a plurality of register sets each for holding data relating to a respective process received from said memory units via said communication system; and processing means for processing a first process by accessing a first of said register sets until said first process requires first further data to be supplied via said communication system, requesting via said communication system said first further data to be supplied from one of said memory units via said communication system and discontinuing the processing of said first process pending the receipt of said first further data and processing a second process by accessing a second register set until second further data is required by said second process or said second process is complete.

2. Data processing apparatus according to claim 1, in which the processing means of said processing unit is arranged to respond to said further second process data being required by requesting said further second process data via said communication system and discontinuing the processing said second process and either processing a third process by acessing a third register set until further third process data is required or continuing processing of said first process.

3. Data processing apparatus according to claim 1, in which there are provided a plurality of processing units and each of said processing units is operable to write data to any of said memory units via said communication system.

4. Data processing apparatus according to claim 1, in which said processing units are 16 bit or 32 bit processors having processing power of similar order to conventional microprocessors.

5. Data processing apparatus according to claim 1, in which said processing units includes flag means for identifying whether a process is ready to be run or awaiting data, and selecting means for selecting said second process for processing from the processes identified as being ready to be run.

6. Data processing apparatus according to claim 5, in which the processing unit include means for supplying data from the communication system to the register set of the process for which said data was requested, said flag means being responsive to said supplying of data by identifying the process to which data has been supplied as being ready to be run.

7. Data processing apparatus according to claim 1, in which said processing unit is operable to request further process data from any of said memory units connected to said communication system.

8. Data processing apparatus according to claim 7, in which data held in a register set is an instruction to the processing unit to be performed as part of a process and is derived from a computer program.

9. Data processing apparatus according to claim 1, further comprising a plurality of processing units and at least one dedicated processing device wherein communication between said processing units and said dedicated processing device is provided via said communication system.

10. Data processing apparatus according to claim 9 in which said dedicated processing device is arranged to perform floating point arithmetic calculations and to supply results of said calculations to said processing units via said communication system.

11. Data processing apparatus according to claim 1, comprising a plurality of processing units, and wherein said communication system comprises:

a plurality of routing means connected by transmission means;

each of said routing means having at least two unidirectional input ports and at least two unidirectional output ports with each input port being connected by respective transmission means to a respective output port of and adjacent routing means and at least one of the output ports being connected to a respective input port of an adjacent routing means;

each said input port being arranged to receive data packets via a respective first-in-first-out (FIFO) storage device;

said data packets having a plurality of temporally separated words including a local destination word, each of said words including a plurality of digits which are transmitted in parallel over said transmission means;

said routing means including means for selectively directing packets to one of its said at least two output ports in response to the local destination word of the packet, and means for controlling the transmission properties of each FIFO to prevent data collision with in the said routing means.

12. Data processing apparatus according to claim 11, including a network configured from said routing means by connecting an output port of a first routing means to the input port of a second routing means wherein at least one pair of input and output ports for each routing means are not connected to another routing means, in which each routing means has five pairs of input ports and output ports, wherein four of said pairs are connected to other routing means, the fifth pair of ports of at least two of said routing means are connected to respective processing units, and the fifth pair of at least two of said routing means are connected to respective memory units.

13. Data processing apparatus according to claim 11, including a network configured from said routing means by connecting an output port of a first routing means to the input port of a second routing means wherein at least one pair of input and output ports for each routing means are not connected to another routing means, in which each routing means includes five pairs of input and output ports, wherein a network of routing means are configured as a hypercube with nodal routing means connected to a processing or memory unit, and the remaining four pairs of ports of each of said transfer routing means are connected to further routing means.

14. Data processing apparatus according to claim 11, in which a request for a datum from a memory unit is made by applying a packet of data to the communication system wherein each packet, (a) identifies the processing unit, (b) identifies the process running on said processing unit, (c) identifies the memory unit from which the datum is required, and (d) specifies the address of said required datum.

15. A data processing apparatus according to claim 11 in which said system is configured on a single wafer of semiconductor material.

16. Data processing apparatus according to claim 1, wherein each memory unit comprises a memory controller arranged to control the transfer of data between the memory unit and the communication system.

17. Data processing apparatus according to claim 7 programmable to operate as a data flow machine, and wherein said memory controllers comprise additional storage means for holding data transferred thereto and therefrom when the data processing system is operating as a data flow machine.

18. Data processing apparatus according to claim 17, in which said additional storage means include a flag field, a value field, and output list field, and an operation field to provide supply driven operation.

19. Data processing apparatus according to claim 17, in which said additional storage means includes a flag field wherein one of the flags of said flag field is a value wanted flag, a value field, an input list and an operation field to enable a demand driven operation.

20. Data processing apparatus according to claim 16, in which there are provided a plurality of processing units and said memory controller includes locking means arranged to perform an indivisible read/write operation which prevents, while one of said processing units is given exclusive access to the memory unit, the other or others of said processing units from communicating with the memory unit via the communication system.

21. Data processing apparatus according to claim 20, in which a process to be run on one of said processing units controls the locking and unlocking of said locking means in response to requests made by another or others of said processing units.

22. Data processing apparatus according to claim 20, in which said memory controllers are programmed with details of the instructions set of said processing units, wherein said controllers are arranged to read a block of data from their respective memory units consisting of processing unit instructions, and said block is terminated on reaching a predetermined size or on reading a datum instructing a process to branch to another area of memory.

23. Data processing apparatus according to claim 20, in which at least one of said processing units is a vector type processor with registers arranged in banks, and blocks of data are supplied from a memory unit to a bank of a registers within said vector processor in response to a single request made via said communication system.

24. A communication system comprising:
a plurality of routing means connected by transmission means;
each of said routing means having at least two unidirectional input ports and at least two unidirectional output ports with each input port being connected by respective transmission means to a respective output port of an adjacent routing means and at least one of the output ports being connected to a respective input port of an adjacent routing means;
each of said input ports being arranged to receive data packets via a respective first-in-first-out (FIFO) storage device;
said data packets having a plurality of temporally separated words including a local destination word, each of said words including a plurality of digits which are transmitted in parallel over said transmission means;
said routing means including means for selectively directing packets to one of its said at least two output ports in response to the local destination word of the packet, and means for controlling the transmission properties of each FIFO to prevent data collision with in said routing means;
in which said routing means is arranged to direct a first received packet to a first selected output port while simultaneously directing a second received packet to a second selected output.

25. A communication system comprising:
a plurality of routing means connected by transmission means;
each of said routing means having at least two unidirectional input ports and at least two unidirectional output ports with each input port being connected by respective transmission means to a respective output port of an adjacent routing means and at least one of the output ports being connected to a respective input port of an adjacent routing means;
each of said input ports being arranged to receive data packets via a respective first-in-first-out (FIFO) storage device;
said data packets having a plurality of temporally separated words including a local destination word, each of said words including a plurality of digits which are transmitted in parallel over said transmission means;
said routing means including means for selectively directing packets to one of its said at least two output ports in response to the local destination word of the packet, and means for controlling the transmission properties of each FIFO to prevent data collision with in said routing means; and
a network configured from said routing means to the input port of a second routing means wherein at least one pair of input and output ports for each routing means are not connected to another routing means;
in which each packet includes data relating to the time during which the packet has been present in the system and the system includes means for removing packets which have been in the system for longer than a predetermined interval.

26. A communication system according to claim 25, in which each routing means receives common clock data to determine the time interval during which a packet has been in the system.

27. A communication system comprising:
a plurality of routing means connected by transmission means;
each of said routing means having at least two unidirectional input ports and at least two unidirectional output ports with each input port being connected by respective transmission means to a respective output port of an adjacent routing means and at least one of the output ports being connected to a respective input port of an adjacent routing means;
each of said input ports being arranged to receive data packets via a respective first-in-first-out (FIFO) storage device;
said data packets having a plurality of temporally separated words including a local destination word, each of said words including a plurality of digits which are transmitted in parallel over said transmission means;
wherein said routing means are nodes of a local and include means for selectively directing packets to one of its said at least two output ports in response to the local destination word of the packet, and means for controlling the transmission properties of each FIFO to prevent data collision with in said routing means; said routing means are nodes of a local network; and a communication system in which said local destination word is the first word of a packet and said routing means includes means for selectively directing words of a packet to an output port while subsequent words of said packet are being received at an input port, in which a plurality of local area networks are connected by second level nodes of a second level network wherein the first word of each packet distributed over said second level network includes a second level destination word preceding said local destination word, and said second level nodes include means for removing or inhibiting said second level words before a packet is distributed over a local network.

28. A communication system according to claim 27 in which a datum of said destination words identify whether said words are for second level or local distribution.

29. A communication system according to claim 27, wherein additional levels of distribution are provided in additional to local and second level distribution.

30. A communication system comprising:
a plurality of routing means connected by transmission means;
each of said routing means having at least two unidirectional input ports and at least two unidirectional output ports with each input port being connected by respective transmission means to a respective output port of an adjacent routing means and at least one of the output ports being connected to a respective input port of an adjacent routing means;
each of said input ports being arranged to receive data packets via a respective first-in-first-out (FIFO) storage device;
said data packets having a plurality of temporally separated words including a local destination word, each of said words including a plurality of digits which are transmitted in parallel over said transmission means;
wherein said routing means are nodes of a local network and include means for selectively directing packets to one of its said at least two output ports in response to the local destination word of the packet, and means for controlling the transmission properties of each FIFO to prevent data collision with in the said routing means;
in which a data processing apparatus is connected to a node of said local area network and said data processing apparatus comprises a data processing apparatus having two or more processing units, two or more memory units, and a communication system providing communication between said processing units and said memory units; wherein each of said processing units includes:
a plurality of register sets each for receiving data relating to a respective process; and
processing means for, processing a first process by accessing a first of said register sets until said first process requires a first datum to be supplied via said communication system, requesting via said communication system a first datum to be supplied back via said communication system and discontinuing the processing of said first process pending the receipt of said first datum, and processing a second process by accessing a second register set.

31. A communication system according to claim 30, in which nodes of the local area network and routing means of the data processing apparatus are configured form similar circuits.

* * * * *